July 29, 1930. D. L. LEWIS 1,771,797
APPARATUS FOR OPENING CEMENT SACKS AND DUMPING
THE CEMENT INTO CEMENT MIXERS
Filed April 4, 1928

Inventor
Doc L. Lewis
By Lyon & Lyon
Attorney

Patented July 29, 1930

1,771,797

UNITED STATES PATENT OFFICE

DOC L. LEWIS, OF DUNCAN, OKLAHOMA, ASSIGNOR TO HALLIBURTON OIL WELL CEMENTING COMPANY, OF DUNCAN, OKLAHOMA, A CORPORATION OF DELAWARE

APPARATUS FOR OPENING CEMENT SACKS AND DUMPING THE CEMENT INTO CEMENT MIXERS

Application filed April 4, 1928. Serial No. 267,366.

This invention relates to an apparatus intended to open cement sacks and dump the contents thereof into a cement mixer.

In the cementing of wells, such as oil wells, a large quantity of neat cement is employed and this cement is pumped down into the well as fast as it is mixed by a jet type mixer. If a considerable period of time lapses between the time of mixing the cement with water and the time at which said cement is disposed in position in the well, the cement is difficult to properly position in place. In the cementing of oil wells where a large amount of cement is required, a great number of bags of cement must therefore be dumped into a cement mixer in a very short period of time. As ordinarily practiced, the cement sacks are opened at one end before the mixing operation and an attempt is made to dump successive sacks of cement into the mixer. The cement passing out of the end of the sack, however, creates a vacuum in back of the sack in the end in opening, retarding the movement of the cement from within the bag and making it difficult to empty a large number of sacks within the time period desired. It should be pointed out in this connection that in cementing of a well by a jet type mixer sometimes as much as 1000 bags or more of cement are employed which must be respectively dumped into the cement mixer, having approximately a 3 ft. cone hopper, within a few minutes of time.

It is an object of the present invention to provide a simple apparatus which will facilitate the opening of cement sacks or containers and the dumping of the cement from said containers into a cement mixer.

In accordance with the present invention a platform is provided connected with the cone hopper of the jet cement mixer upon which the cement sacks may be laid and slid towards the hopper, the cement sacks being advanced with one of their sides towards the hopper rather than being advanced end first. There is also provided a knife or other sack severing means in the center line of the platform near the hopper operative for parting the sack in its center as it is pulled over the hopper and thereby permitting the discharge of the cement from the middle rather than from the end of the sacks.

The apparatus of the present invention will be readily understood from a description of a preferred form or example of an apparatus for dumping cement embodying the invention. For this purpose there is hereinafter described a preferred example of an apparatus embodying the present invention. The description is given with reference to the accompanying drawings in which:—

Figure 1:
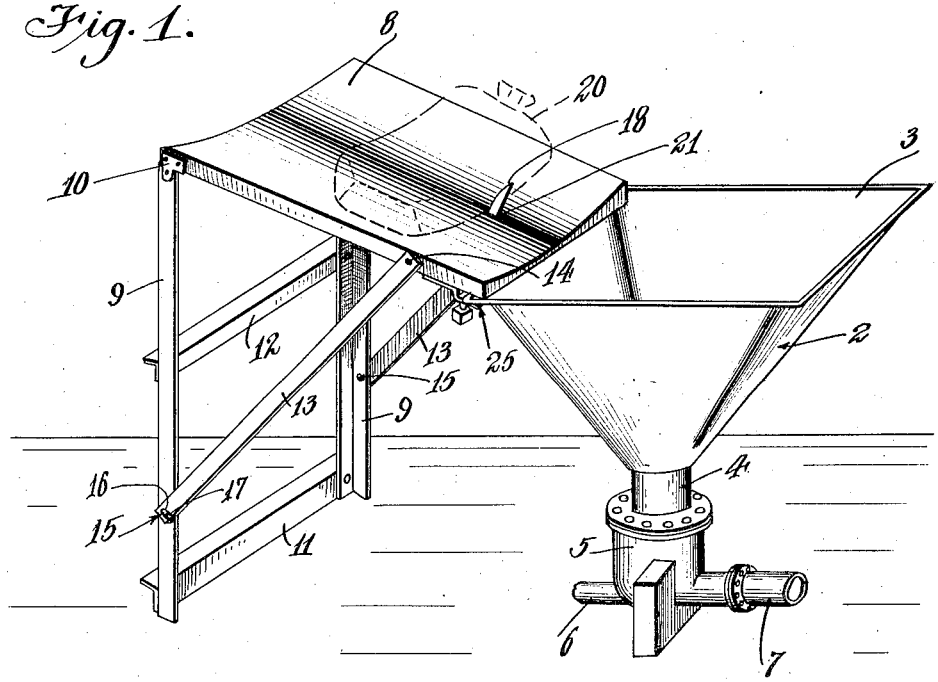
Figure 1 is a perspective view.
Figure 2:
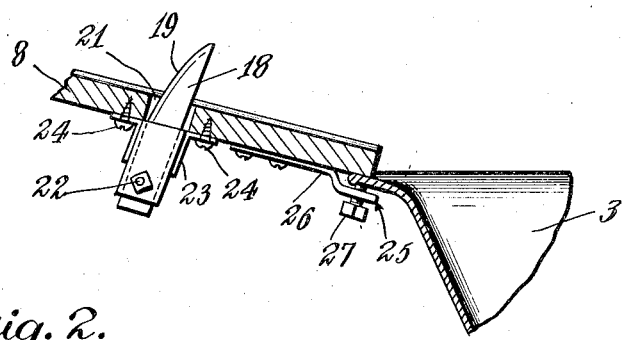
Figure 2 is a fragmentary vertical section.

Referring to the drawings, 2 generally indicates a jet type cement mixer which is provided with the usual feeding hopper 3 which in practice is maintained substantially full of dry cement. The jet type mixer also includes a discharge 4 into a mixing chamber 5 into which a high velocity jet of liquid is injected from a line 6 to provide a means for drawing cement from the hopper 3 and mixing the cement with the liquid and discharging the same through the discharge line 7.

8 indicates a loading platform mounted to slope towards the open hopper 3 and preferably bowed in its center to assist in guiding cement sacks towards the open hopper 3. The platform 8 is provided with suitable supporting means including legs 9 disposed at each side of the platform at the end of the platform space from the mixer 3, and said legs 9 are preferably connected with the platform 8 by a bracket 10 which provides a pivot connection between the platform 8 and legs 9. The legs 9 connect at their lower end with a foot bar 11 and are connected near their upper ends by a horizontal cross bar 12. There is also provided a pair of brace members 13 pivoted at one end 14 to the platform 8 near the hopper end thereof, and at their lower end connected with the legs 9 near the lower ends of the legs 9. The connecting means 15 between the braces 13 and the legs 9 provide a detachable connection which permits the braces to be released and the entire loading platform folded up when it is desired to move the mixing apparatus. The preferred form of such detachable connecting means is shown as comprising pins 16 fitted into notches 17 in the ends of the braces 13. It will be seen that by releasing the braces 13 from the legs 9, the entire apparatus may be folded up and then readily transported. This is of advantage as an apparatus of this kind must be carried to various different places in the oil fields.

18 indicates a sack severing member or means preferably in the form of a knife extending vertically upward at the center line of the platform 8 and near the discharge end of said platform. Said knife preferably has its blade curved towards the discharge end of the platform 8 as indicated at 19 so that the knife will have a cutting or abrasing action against the sack, one of which is indicated by dotted lines at 20 for causing the sack to be more readily cut. The knife 18 is preferably formed of hard metal, such as steel, and extends through an opening 21 in the platform 8 to below the platform where it is secured by means, such as a bolt 22, to a knife holding bracket 23 screwed as indicated at 24 to the bottom of the platform 8.

The platform is also provided with a means 25 for attaching the same to a lip of the mixer hopper 3, said means comprising a bracket 26 and a clamping bolt 27.

In use of the apparatus of the present invention the bags or sacks of cement are moved along the platform 8 with a man grasping each end of the bag and as the bag passes over the severing means 18, the bag is torn in two and each man dumps half of the bag of the cement into the hopper 3 returning for the next bag on the end of the platform. With two men for loading bags upon the platform 8 and two men for moving the bags over the platform for cutting and emptying the same the same amount of cement sacks may be opened and emptied which otherwise would require the work of approximately twelve men with greater effort, and moreover, the cement may be more rapidly deposited into the mixer.

While the apparatus herein described is well adapted for carrying out the objects of the present invention, it is to be understood that many modifications and changes may be made without departing from the invention, and the invention includes all such modifications and changes as come within the scope of the following claims.

I claim:

1. An apparatus for opening and dumping cement from sacks into a hopper of a cement mixer comprising, a loading platform, means for holding the loading platform in position leading to said cement mixer hopper, and sack severing means projecting above said platform and positioned to sever sacks of cement passed along said platform to said hopper.

2. An apparatus for opening and dumping cement from sacks into the hopper of a cement mixer comprising, a platform having a sack severing knife located in its center line adjacent the discharge end of said platform, and means for supporting said platform in position leading to said cement hopper.

3. An apparatus for opening and dumping cement sacks into the hopper of a cement mixer comprising, a loading platform, means for holding the loading platform in position leading to said cement mixer hopper, sack severing means projecting above said platform and positioned to sever sacks of cement passed along said platform to said hopper, and supporting means for said platform comprising a collapsible supporting frame.

4. An apparatus for opening and discharging cement sacks into the hopper of a cement mixer comprising, a platform, means for clamping the discharge end of said platform to the lip of a cement hopper, a collapsible supporting frame for said platform, and a sack severing member projecting above said platform near the discharge end thereof.

5. An apparatus for opening and discharging cement sacks into a cement mixer comprising, a platform along which cement sacks may be translated sideways, means for clamping said platform to the lip of a cement mixer, and sack severing means near the center line of said platform and projecting above said platform in position to sever the side of a sack of cement translated along said platform to said cement mixer.

Signed at Duncan, Okla., this 20 day of February, 1928.

DOC L. LEWIS.